US009619731B2

United States Patent
Akama et al.

(10) Patent No.: US 9,619,731 B2
(45) Date of Patent: Apr. 11, 2017

(54) IMAGE SYMMETRY FOR DIP DETERMINATION

(71) Applicant: SCHLUMBERGER TECHNOLOGY CORPORATION, Sugar Land, TX (US)

(72) Inventors: Taketo Akama, Sapporo (JP); Josselin Kherroubi, Paris (FR); Arnaud Etchecopar, La Rochelle (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 8 days.

(21) Appl. No.: 14/781,082

(22) PCT Filed: Mar. 31, 2014

(86) PCT No.: PCT/US2014/032301
§ 371 (c)(1),
(2) Date: Sep. 29, 2015

(87) PCT Pub. No.: WO2014/160994
PCT Pub. Date: Oct. 2, 2014

(65) Prior Publication Data
US 2016/0307066 A1    Oct. 20, 2016

Related U.S. Application Data

(60) Provisional application No. 61/806,776, filed on Mar. 29, 2013.

(30) Foreign Application Priority Data

Mar. 29, 2013 (EP) ..................................... 13305414

(51) Int. Cl.
*G06K 9/00* (2006.01)
*G06K 9/52* (2006.01)
(Continued)

(52) U.S. Cl.
CPC ............... *G06K 9/52* (2013.01); *G01V 1/301* (2013.01); *G06T 7/0042* (2013.01); *G06T 7/608* (2013.01);
(Continued)

(58) Field of Classification Search
CPC ................................... G06K 9/00; G06T 7/00
(Continued)

(56) References Cited

U.S. PATENT DOCUMENTS 4,251,773 A * 2/1981 Cailliau .................. G01V 3/20
324/347
4,357,660 A    11/1982 Hepp
(Continued)

FOREIGN PATENT DOCUMENTS

EP    0379432 B1    6/1994
GB    2469416 A    10/2010

OTHER PUBLICATIONS

International Search Report and Written Opinion issued in related International Application No. PCT/US2014/032301 mailed Aug. 18, 2014.
(Continued)

*Primary Examiner* — Abolfazl Tabatabai

(57) ABSTRACT

Methods for dip determination from an image obtained by a down-hole imaging tool. For each pixel forming the image, a probability that a symmetry axis coincides with the pixel is determined. A probability map is then generated, depicting the determined probability of each pixel coinciding with the symmetry axis. The probability map and the image are then superposed to generate a mapped image. The symmetry axis is then estimated based on the mapped image. Image pixels coinciding with a boundary of the geologic feature are then selected in multiple depth zones, and a segment of a sinusoid is fitted to the selected image pixels within each depth zone.

(Continued)

Dip within each of the depth zones is then determined based on the fitted sinusoid segments therein.

20 Claims, 9 Drawing Sheets

(51) Int. Cl.
*G01V 1/30* (2006.01)
*G06T 7/60* (2017.01)
*G06T 7/00* (2017.01)
*G01V 3/00* (2006.01)

(52) U.S. Cl.
CPC ...... *G01V 2210/64* (2013.01); *G06T 2207/10072* (2013.01); *G06T 2207/10136* (2013.01); *G06T 2207/20076* (2013.01); *G06T 2207/30181* (2013.01)

(58) Field of Classification Search
USPC ........ 382/109; 324/333, 338, 347, 351, 368, 324/625; 367/69; 702/6, 10, 11
See application file for complete search history.

(56) References Cited

U.S. PATENT DOCUMENTS

| | | | |
|---|---|---|---|
| 4,869,591 A | 9/1989 | MacGregor | |
| 4,939,649 A | 7/1990 | Duffy | |
| 5,299,128 A | 3/1994 | Antoine et al. | |
| 5,809,163 A | 9/1998 | Delhomme et al. | |
| 5,960,371 A * | 9/1999 | Saito ....................... | G01V 1/50 702/10 |
| 5,983,163 A | 11/1999 | Waid et al. | |
| 7,236,887 B2 | 6/2007 | Wang et al. | |
| 2011/0305371 A1 | 12/2011 | Liu | |

OTHER PUBLICATIONS

Riedel et al., "Mass-transport deposits and gas hydrate occurrences in the Ulleung Basin, East Sea—Part 2: Gas hydrate content and fracture-induced anisotropy", Marine and Petroleum Geology, vol. 35, No. 1, Mar. 14, 2012, pp. 75-90.

Office Action issued in related RU application 2015146202 on Jul. 1, 2016, 12 pages.

* cited by examiner

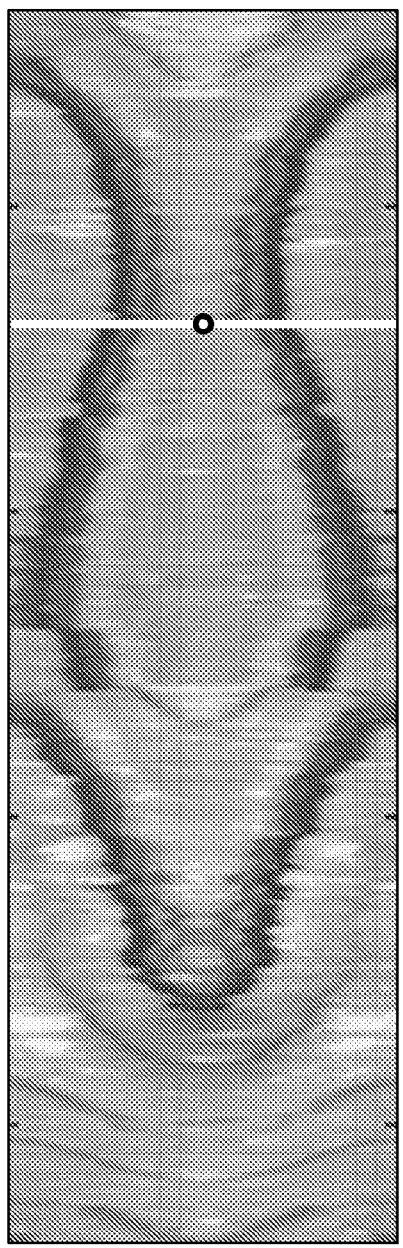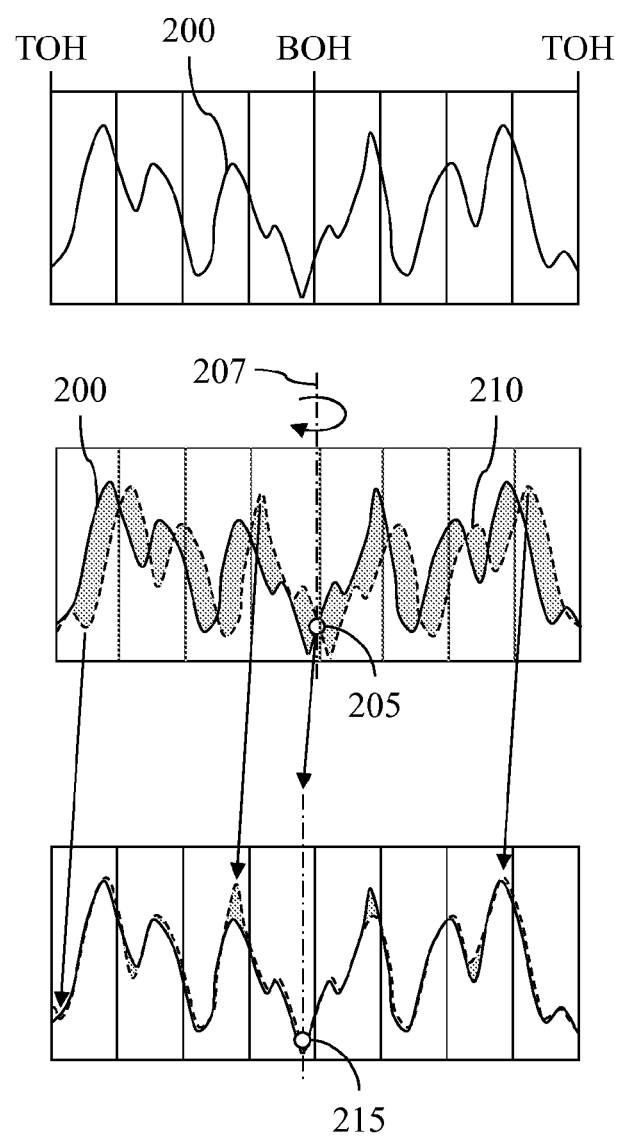
FIG. 5
FIG. 6

IMAGE SYMMETRY FOR DIP DETERMINATION

BACKGROUND OF THE DISCLOSURE

Borehole images may be utilized to evaluate structural or sedimentary dip of layers and laminations crossed by the borehole. For example, borehole images may be interpreted in terms of dips to delineate the geometry of layers forming the reservoirs and their cap-rocks. While drilling highly deviated wells, a small error in the evaluation of the transverse component of the dip may lead to a large error on the actual dip and azimuth of the layer. This may result in the success or failure of a borehole, such as staying within a target reservoir layer (success) versus departing from the target reservoir layer (failure).

SUMMARY OF THE DISCLOSURE

The present disclosure introduces a method comprising conveying a downhole imaging tool of a dip determination system within a borehole, wherein the borehole extends from a wellsite surface to a subterranean formation, and wherein the dip determination system further comprises surface equipment disposed at the wellsite surface. The downhole imaging tool is operated to obtain an image of a geologic feature within the subterranean formation. The dip determination system is operated to determine an aspect of the geologic feature by determining a symmetry axis of the image, determining a longitudinal component of the feature based on the determined symmetry axis, and determining a transverse component of the feature based on the determined symmetry axis. The longitudinal component is then split into sections, and the longitudinal component sections are combined with the transverse component to determine corresponding sinusoid segments. A single dip value is then assigned to each depth based on the sinusoid segments.

The present disclosure also introduces a method comprising conveying a downhole imaging tool of a dip determination system within a borehole, wherein the borehole extends from a wellsite surface to a subterranean formation, and wherein the dip determination system further comprises surface equipment disposed at the wellsite surface. The downhole imaging tool is operated to obtain an image of a geologic feature within the subterranean formation. The dip determination system is operated to determine an aspect of the geologic feature by determining, for each pixel forming the image, a probability that a symmetry axis coincides with the pixel. A probability map is then generated, depicting the determined probability of each pixel coinciding with the symmetry axis. The probability map and the image are then superposed to generate a mapped image. The symmetry axis is then estimated based on the mapped image. Image pixels coinciding with a boundary of the geologic feature in each of a plurality of depth zones are then selected, and a segment of a sinusoid is fitted to the selected image pixels within each depth zone. Dip within each of the depth zones is then determined based on the fitted sinusoid segments therein.

The present disclosure also introduces an apparatus comprising a dip determination system, including a downhole imaging tool and surface equipment. The downhole imaging tool is conveyable within a borehole that extends from a wellsite surface to a subterranean formation, and is operable to obtain an image of a geologic feature within the subterranean formation while disposed in the borehole proximate the geologic feature. The surface equipment is disposed at the wellsite surface, and is in electrical communication with the downhole image tool. The dip determination system is operable to determine an aspect of the geologic feature by determining, for pixel forming the image, a probability that a symmetry axis coincides with the pixel. A probability map is then generated, depicting the determined probability of each pixel coinciding with the symmetry axis. The probability map and the image are superposed to generate a mapped image. The symmetry axis is then estimated based on the mapped image. Image pixels coinciding with a boundary of the geologic feature in each of a plurality of depth zones are then selected. A segment of a sinusoid is then fitted to the selected image pixels within each depth zone. Dip within each of the plurality of depth zones is then determined based on the fitted sinusoid segments therein.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 5 is a schematic view of a borehole image in an intermediate stage of processing according to one or more aspects of the present disclosure.

FIG. 6 is a schematic view of curves plotted in a borehole image view according to one or more aspects of the present disclosure.

DETAILED DESCRIPTION

Figure 1:
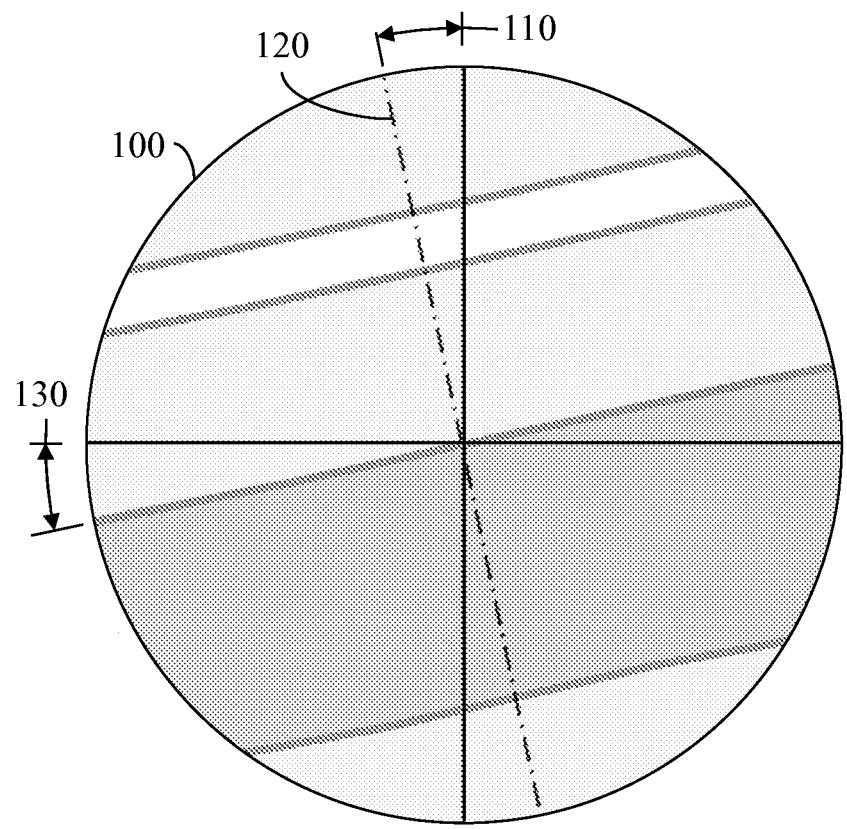
FIG. 1 is a schematic view of a borehole section according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Conventional dip selection in highly deviated wells utilizes methods developed for substantially vertical wells. However, this may introduce inaccuracies. One or more aspects of the present disclosure may regard determining image symmetry that, at least in some implementations, may provide the transverse component of the layers or laminations dip.

When a well trajectory is close to or otherwise substantially perpendicular to bedding, the intersection of the borehole and a layer or boundary of the bedding corresponds to a small surface that can be considered to be planar and displayed as a single sinusoid on the image. This is no longer true when the angle between the borehole trajectory and the layer surface is low (e.g., substantially less than about 90 degrees). That is, the intersection surfaces become very long and cannot be considered to be planar, and such intersection surfaces may therefore be split into several consecutive sections of plane. One or more aspects of such processing, and/or the one or more related techniques for doing so, may be utile for real-time image interpretation, and may be included in while-drilling image acquisition procedures within the scope of the present disclosure. Moreover, this method may be applicable in boreholes having vertical to highly deviated trajectories, and may also be utile in implementations in which the borehole trajectory orientation is close to bed boundary dips.

One or more aspects introduced in the present disclosure relate to a method for extracting layer boundary dips for structural interpretation utilizing a processed borehole image. The processed borehole image may be obtained by one or more conventional or future-developed downhole tools, such as the FMI FULLBORE FORMATION MICROIMAGER, the ULTRASONIC BOREHOLE IMAGING (UBI) tool, the MICROSCOPE UHRI (ultra high resolution imaging) tool, the PERISCOPE tool, the ARCVISION tool, the GEOVISION tool, and/or the MCRVISION tool, each of SCHLUMBERGER. However, one or more aspects of the present disclosure are also applicable or readily adaptable for use with other downhole imaging tools, and such implementations are also considered to be within the scope of the present disclosure.

Depending on the parallelism of a borehole and a layer boundary, their intersection surface may or may not be long enough to exhibit variation in dip. Consequently, a single plane may not accurately approximate the intersection. With existing techniques, the intersection surface may nevertheless be oriented using a sinusoid, as if the borehole was substantially vertical. However, adjusting a single sinusoid over a complex surface may result in an unacceptable uncertainty, as explained below with in FIGS. 1-4.

Figure 2:
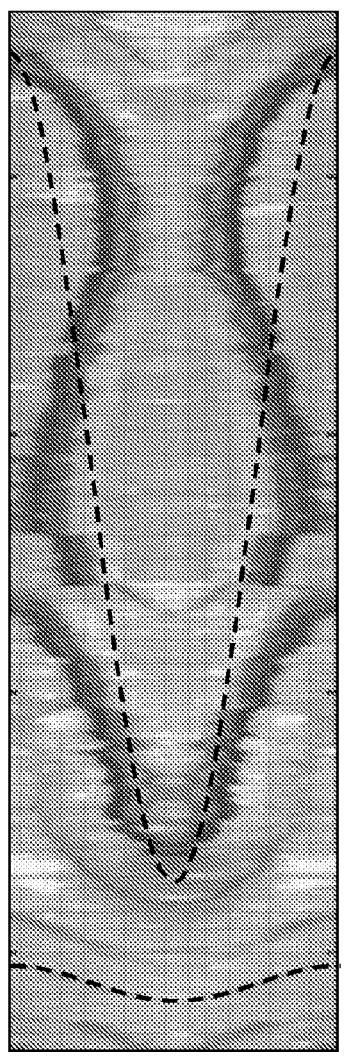
FIG. 2 is a borehole image depicting one or more aspects of the present disclosure.
Figure 3:
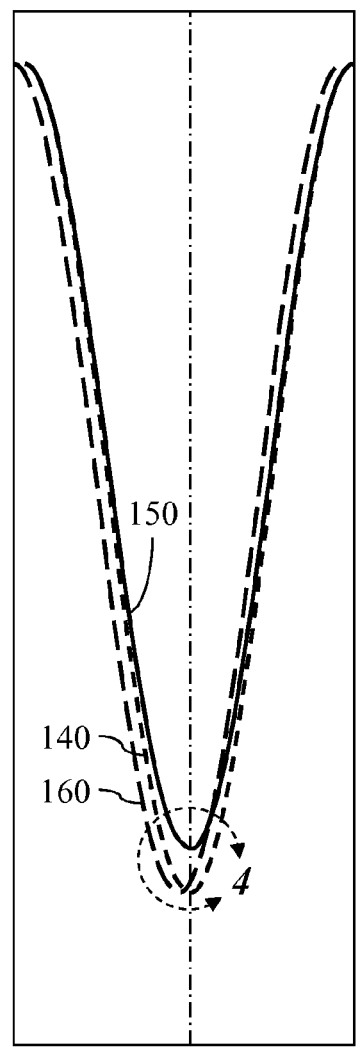
FIG. 3 is a schematic view of the borehole image shown in FIG. 2 according to one or more aspects of the present disclosure.
Figure 4:
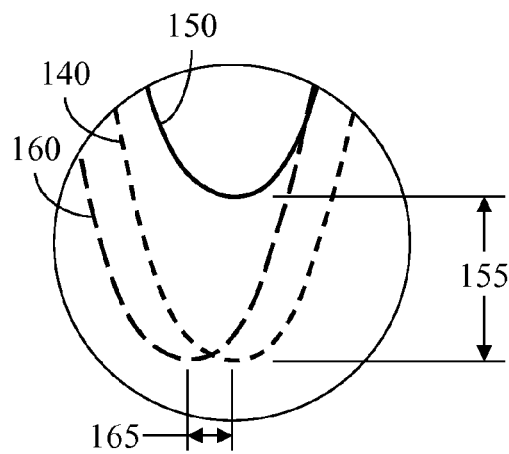
FIG. 4 is an enlarged view of a portion of FIG. 3.

FIG. 1 depicts a section of a borehole 100, and demonstrates that deviation 110 of the axis of symmetry 120 relative to the top of the borehole 100 provides the transverse component 130 of dip. FIG. 2 depicts an example image obtained with a logging-while-drilling (LWD) imaging tool in a horizontal borehole, and demonstrates the conventional method of fitting a single sinusoid and the resulting dip delineation uncertainty. FIG. 3 is a schematic view of example sinusoids for a horizontal borehole, including a reference sinusoid 140, a first example sinusoid 150, and a second example sinusoid 160. FIG. 4 is an enlarged view of a portion of FIG. 3, demonstrating a small transverse component error 165 and its impact on dip uncertainty relative to the impact of a large longitudinal component error 155. The large longitudinal component error 155 of the first example sinusoid 150 is about ten pixels, which corresponds to a dip error of about 0.3 degrees. However, while the small transverse component error 165 of the second example sinusoid 160 is about two pixels, considerably less than the error 155, the corresponding dip error induced by the transverse component error 166 is about 13 degrees.

As depicted in FIGS. 2-4, an imaging sinusoid may be deconstructed into longitudinal and transverse components, in which the amplitude of the sinusoid corresponds to the longitudinal component relative to the well, and the phase (i.e., the position of the top/bottom of the sinusoid relative to the top of the borehole) corresponds to the transverse component. An error on the longitudinal component may not substantially affect the dip value. However, the transverse component, which is shorter or less than the borehole diameter, may be difficult to capture from low definition imaging, and is often the primary cause of error on dip.

In this context, the present disclosure introduces a method comprising determining the transverse component of the dip, such as by computing the symmetry axis of the image. The longitudinal component may then be split (perhaps interactively) into sections that, when combined with the transverse component, define segments of one or more sinusoids. A single dip value may then be assigned to each depth.

One or more methods within the scope of the present disclosure may comprise calculating the probability of symmetry existence at each pixel. A probability image may then be generated (and perhaps displayed to a human operator), wherein each pixel in a given row (measured depth) and column (azimuth) may have a pixel value corresponding to the probability of the pixel being a symmetry axis.

FIGS. 5 and 6 depict one or more aspects of a method for calculating each pixel value according to one or more aspects of the present disclosure. FIG. 5 depicts an example image obtained utilizing an LWD imaging tool in a horizontal borehole. In FIG. 6, the top image (relative to the page) represents a reference curve 200 perpendicular to the borehole, extending from the top of the borehole (TOH) to the bottom of the borehole (BOH) and back to the top. The middle image represents a curve 210 that is a mirror image of the curve 200 resulting from rotation around a point 205 of the curve 200, the point being represented in FIG. 6 by axis 207. Shading represents misfit between the curves 200 and 210. The bottom image depicts that, for one particular point 215, the misfit (shading) is minimum and the symmetry is maximum. That is, for a given pixel 215, corresponding to the measured depth z (the vertical direction relative to the orientation shown in FIG. 6) and the azimuth a (the horizontal direction relative to the orientation shown in FIG. 6), the similarity between the image curve defined by the same measured depth z and delimited by the azimuth interval [α, α+π] and the mirror image curve at the same measured depth z and in the azimuth interval [α−π, α] may be evaluated. The similarity may be measured by a cross-correlation, a function of the norm of the difference between both curves, and/or other methods.

Figures 7, 8, 9:
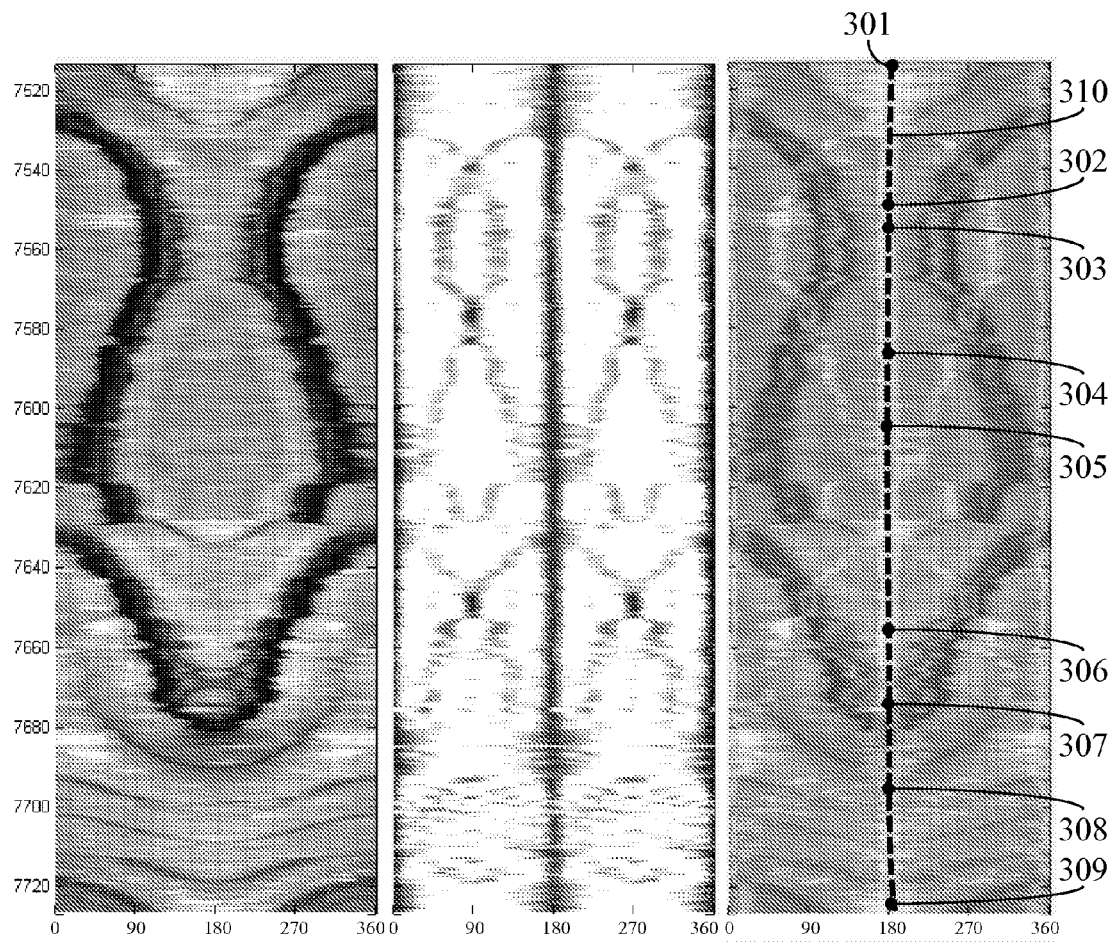
FIG. 7 is a schematic view of a borehole image in an intermediate stage of processing according to one or more aspects of the present disclosure.
FIG. 8 is a schematic view of a probability map according to one or more aspects of the present disclosure.
FIG. 9 is a schematic view superposing FIGS. 7 and 8 according to one or more aspects of the present disclosure.

An example of the probability image is set forth in FIGS. 7-9. FIG. 7 depicts an example image obtained utilizing an LWD imaging tool in a horizontal borehole. FIG. 8 depicts a map of the symmetry probability, such as may be determined in a manner similar to that described above with respect to FIG. 6. FIG. 9 depicts the superposition of the image of FIG. 7 and the probability map of FIG. 8, from which an operator may select different points 301-309 to be utilized in delineating the symmetry axis 310.

For example, an operator may select an interval on the image, thereby defining a zone for processing. The probability of each point in the zone being a symmetry axis 310 transverse to the image may then be computed and displayed, as in FIG. 8. The map of these probabilities may then be superposed on the original image, as shown in FIG. 9. The operator may select a number of points 301-309 that accurately belong to the symmetry axis 310 on the image, such as by selecting points having probabilities exceeding a predetermined threshold. One or more semi-automatic and/or other processes (perhaps based on spline interpolation and/or other types of interpolation within the scope of the present disclosure) may then link the chosen points 301-309 to define a continuous symmetry axis 310 that defines the transverse component of the dip at any depth.

Dip delineation may comprise dip selection, followed by sinusoid fitting, and then dip computation. Dip selection may be a substantially manual process. For example, a feature may be identified by manually selecting two points on the same layer boundary.

Sinusoid fitting may utilize two extra points that may be automatically or otherwise created with respect to the symmetry axis. A segment of a sinusoid fitting the four points may then be automatically or otherwise determined over the measured depth interval defined by these points. The measured depth of the dip may be affected to the middle of the measured depth interval, instead of at the center of the sinusoid as per convention. As a result of the sinusoid fitting, the zoning may cover the entire image relative to the sinusoid segments.

Dip computation may determine a dip for each measured depth. For example, from the previously defined sinusoids (or segments thereof), a dip may be affected at each zone depth according to predetermined rules. One such rule may provide that where two or more sinusoid segments overlap, the corresponding dip affected to that measured depth is the average value of these dips. Another example rule provides that if there are zones where no dip has been calculated, an interpolated dip is calculated based on neighboring zones (just above and just below along the trajectory). The interpolated dip may be flagged as lower quality or less accurate.

Figure 10:
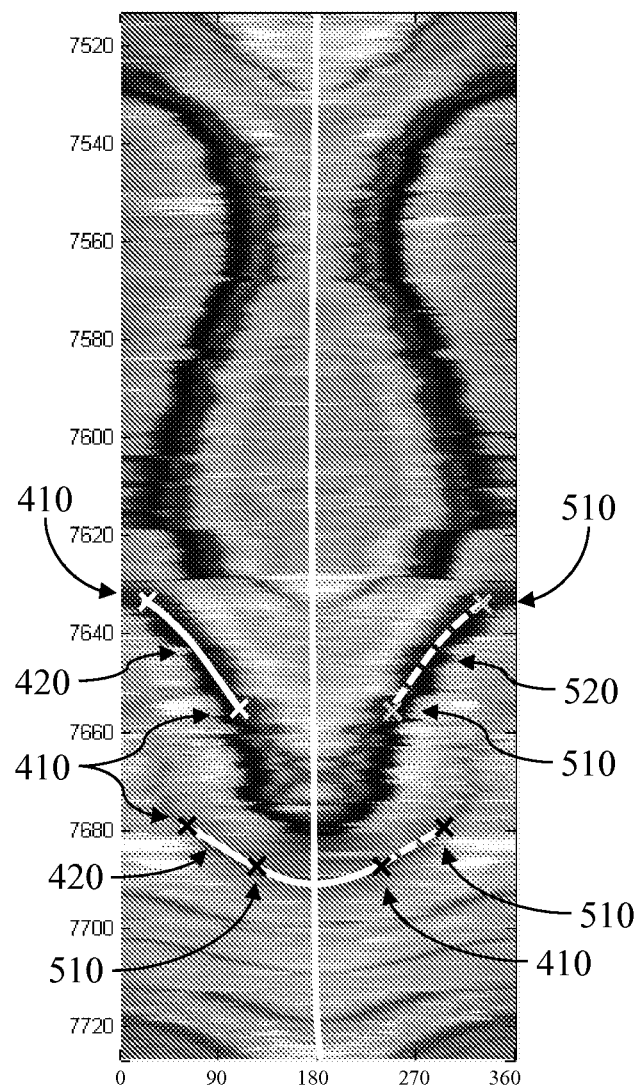
FIG. 10 is a schematic view of FIG. 9 in a subsequent stage of processing according to one or more aspects of the present disclosure.
Figure 11:
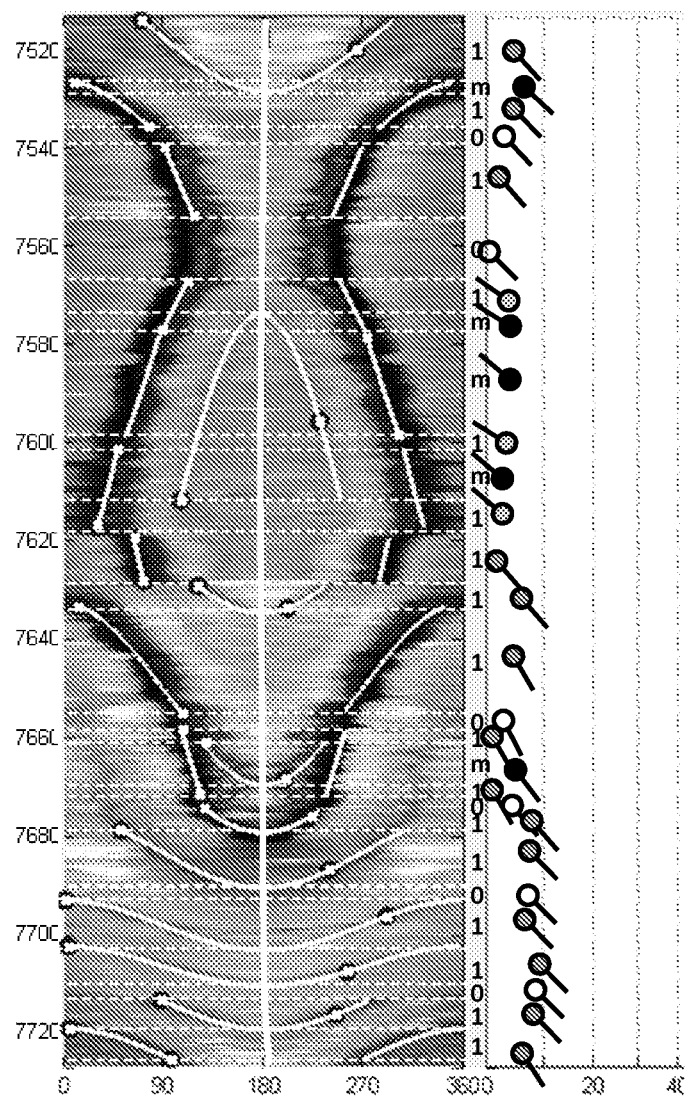
FIG. 11 is a schematic view of FIG. 10 in a subsequent stage of processing according to one or more aspects of the present disclosure.

FIGS. 10 and 11 depict an example of the above-described dip delineation according to one or more aspects of the present disclosure. FIG. 10 depicts a method for selecting the dip of a layer with respect to the symmetry axis according to one or more aspects of the present disclosure. For example, the operator selects a number of points 410 on a layer limit. Symmetry points 510 may then appear automatically, as well as sinusoid segments 420 joining the points 410 and sinusoid segments 520 joining the points 510.

FIG. 11 depicts example zoning with respect to the number of sinusoid segments in the interval. There may be three types of zones: Type-0, for which there are zero sinusoid segments in the zone; Type-1, for which there is one sinusoid segment in the zone; and Type-m, for which there are multiple segments of sinusoid in the zone. FIG. 11 also depicts a summary arrow plot with one single dip in each zone. There may be several ways to determine the average dip of a zone. For example, when no sinusoids/segments exist, the dip may be determined as the average of the dips in the zones above and below. These may be considered low quality, and are depicted in white in FIG. 11. When a single sinusoid/segment exists, its dip may be validated. These may be considered medium quality, and are depicted in gray in FIG. 11. When multiple sinusoids/segments exist, the dips may be averaged. The quality of these may depend on the parallelism of the selected segments of sinusoid, and are depicted in black in FIG. 11.

In view of the above, a person having ordinary skill in the art should readily recognize that the present disclosure introduces one or more methods for retrieving a dip at each measured depth. Such methods may be iteratively applied in some implementations, such as for the real-time interpretation of images while drilling for enhanced geosteering. Example implementations of such methods are described below, although others are also within the scope of the present disclosure.

Figure 12:
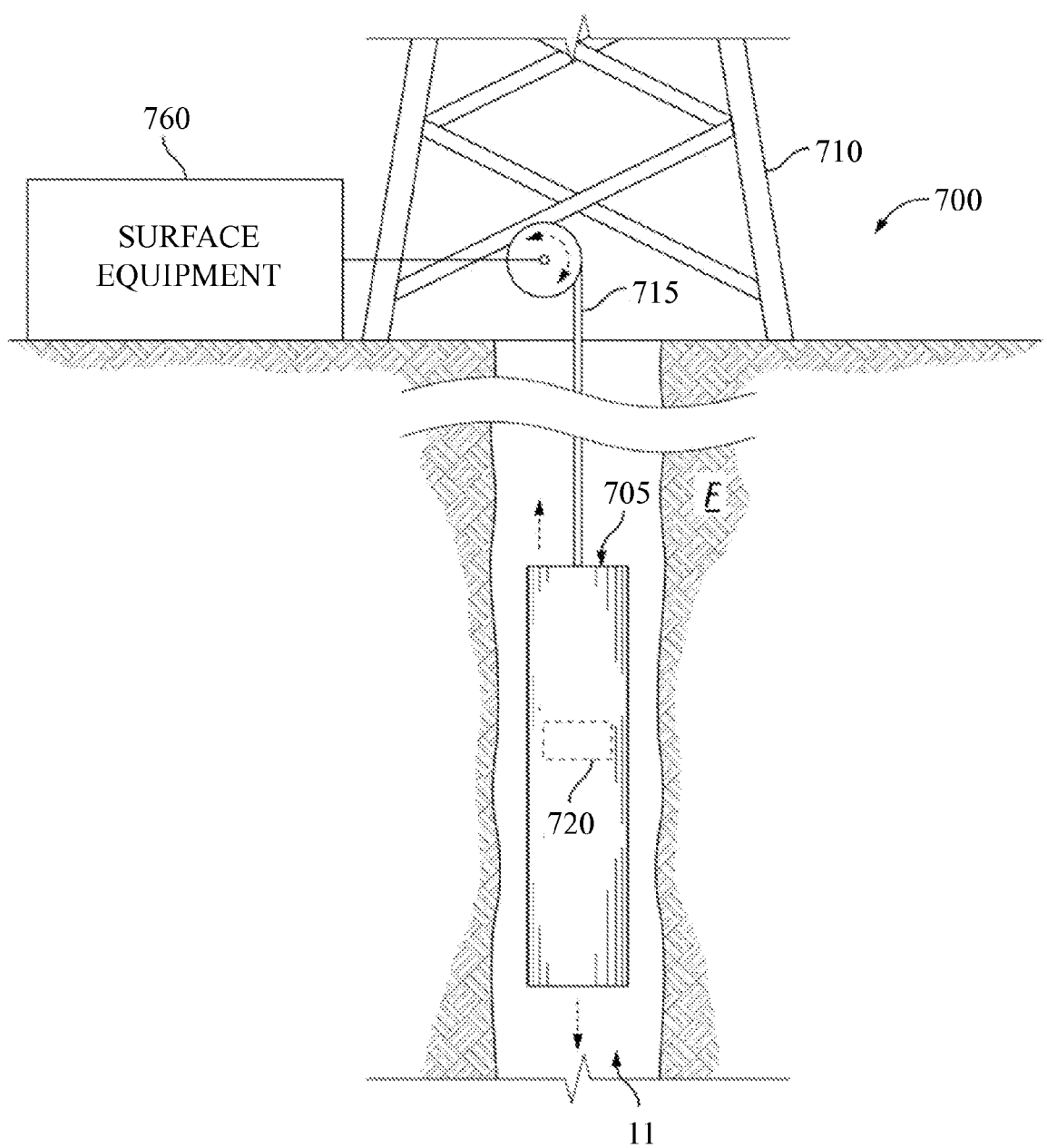
FIG. 12 is a schematic view of at least a portion of apparatus according to one or more aspects of the present disclosure.

FIG. 12 is a schematic view of an example dip detection system 700 that may be employed onshore and/or offshore according to one or more aspects of the present disclosure, representing an example environment in which one or more aspects described above may be implemented. As depicted in FIG. 12, a downhole tool 705 may be suspended from a rig 710 in a borehole 11 formed in one or more subterranean formations F. The downhole tool 705 may be or comprise an acoustic tool, a conveyance tool, a density tool, an electromagnetic (EM) tool, a formation evaluation tool, a magnetic resonance tool, a monitoring tool, a neutron tool, a nuclear tool, a photoelectric factor tool, a porosity tool, a reservoir characterization tool, a resistivity tool, a seismic tool, a surveying tool, and/or a telemetry tool, although other downhole tools are also within the scope of the present disclosure. The downhole tool 705 may be deployed from the rig 710 into the borehole 11 via a conveyance means 715, which may be or comprise a wireline cable, a slickline cable, and/or coiled tubing, although other means for conveying the downhole tool 705 within the borehole 11 are also within the scope of the present disclosure. As the downhole tool 705 operates, outputs of various numbers and/or types from the downhole tool 705 and/or components thereof (one of which is designated by reference numeral 720) may be sent via, for example, telemetry to a logging and control system and/or other surface equipment 760 at surface, and/or may be stored in various numbers and/or types of memory for subsequent recall and/or processing after the downhole tool 705 is retrieved to surface. The downhole tool 705 and/or one or more components 720 thereof may be utilized to perform at least a portion of a method according to one or more aspects of the present disclosure.

Figure 13:
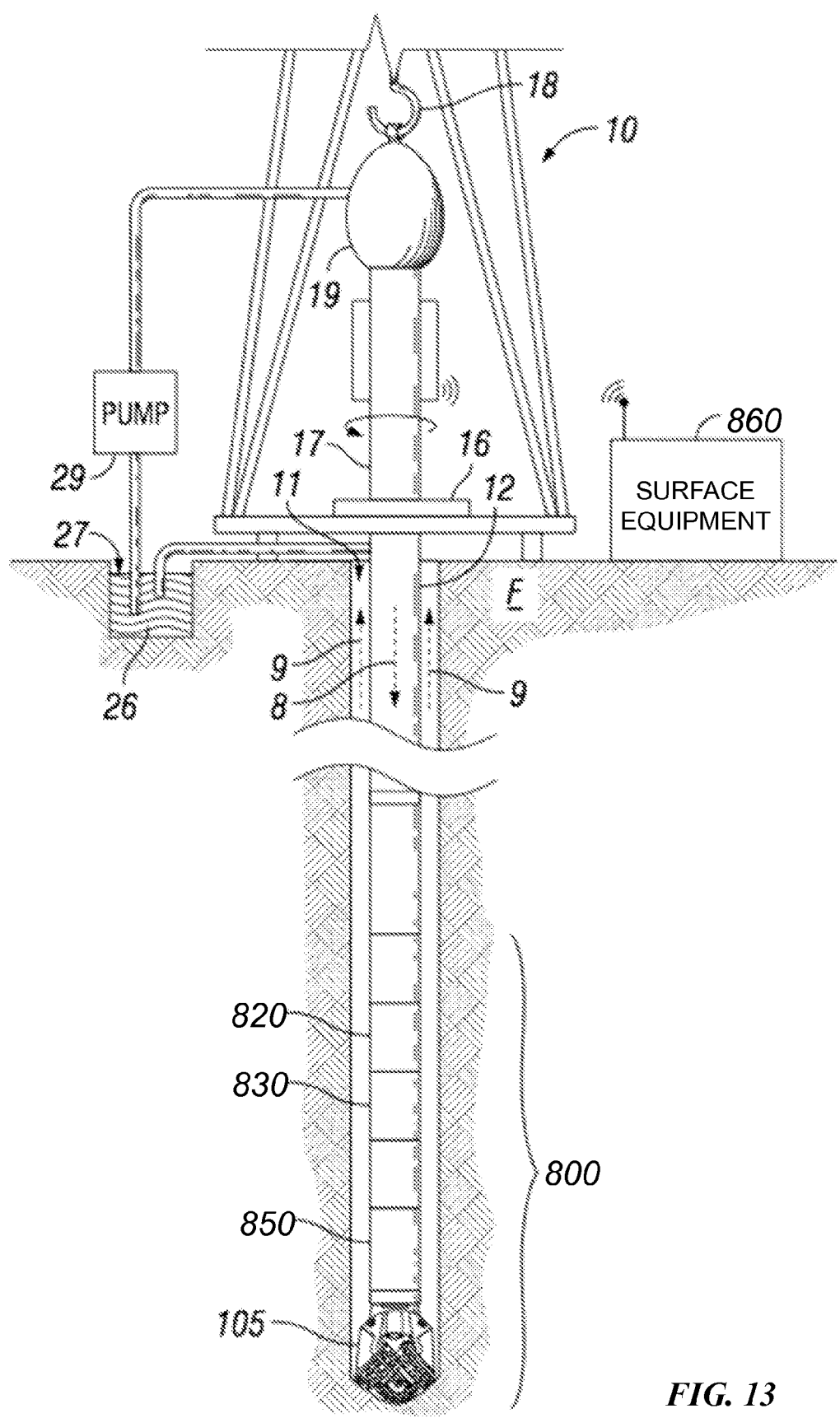
FIG. 13 is a schematic view of at least a portion of apparatus according to one or more aspects of the present disclosure.

FIG. 13 is a schematic view of an example wellsite system that can be employed onshore and/or offshore, perhaps including at the same wellsite as depicted in FIG. 12, where the borehole 11 may have been formed in the one or more subsurface formations F by rotary and/or directional drilling. As depicted in FIG. 13, a conveyance means 12 suspended within the borehole 11 may comprise or be connected to a bottom hole assembly (BHA) 800, which may have a drill bit 805 at its lower end. The conveyance means 12 may comprise drill pipe, wired drill pipe (WDP), tough logging conditions (TLC) pipe, coiled tubing, and/or other means of conveying the BHA 800 within the borehole 11.

The surface system at the wellsite may comprise a platform and derrick assembly 10 positioned over the borehole 11, where such derrick may be substantially similar or identical to the rig 710 shown in FIG. 12. The assembly 10 may include a rotary table 16, a kelly 17, a hook 18, and/or a rotary swivel 19. The conveyance means 12 may be rotated by the rotary table 16, energized by means not shown, which may engage the kelly 17 at the upper end of the conveyance means 12. The conveyance means 12 may be suspended from the hook 18, which may be attached to a traveling block (not shown), and through the kelly 17 and the rotary swivel 19, which permits rotation of the drillstring 12 relative to the hook 18. Additionally, or alternatively, a top drive system may be used.

The surface system may also include drilling fluid 26, which is commonly referred to in the industry as mud, stored in a pit 27 formed at the well site. A pump 29 may deliver the drilling fluid 26 to the interior of the conveyance means 12 via a port (not shown) in the swivel 19, causing the drilling fluid to flow downwardly through the conveyance means 12 as indicated by the directional arrow 8. The drilling fluid 26 may exit the conveyance means 12 via ports in the drill bit 805, and then circulate upwardly through the annulus region between the outside of the conveyance means 12 and the wall of the borehole 11, as indicated by the directional arrows 9. The drilling fluid 26 may be used to lubricate the drill bit 805, carry formation cuttings up to the surface as it is returned to the pit 27 for recirculation, and/or create a mudcake layer (not shown) on the walls of the borehole 11. Although not pictured, one or more other circulation implementations are also within the scope of the present disclosure, such as a reverse circulation implementation in which the drilling fluid 26 is pumped down the annulus region (i.e., opposite to the directional arrows 9) to return to the surface within the interior of the conveyance means 12 (i.e., opposite to the directional arrow 8).

The BHA 800 may include various numbers and/or types of downhole tools, schematically depicted in FIG. 13 as tools 820, 830, and 850. Examples of such downhole tools include an acoustic tool, a density tool, a directional drilling tool, a drilling tool, an EM tool, a formation evaluation tool, a gravity tool, a logging while drilling (LWD) tool, a magnetic resonance tool, a measurement while drilling (MWD) tool, a monitoring tool, a neutron tool, a nuclear tool, a photoelectric factor tool, a porosity tool, a reservoir characterization tool, a resistivity tool, a seismic tool, a surveying tool, a telemetry tool, and/or a tough logging condition (TLC) tool, although other downhole tools are also within the scope of the present disclosure. One or more of the downhole tools 820, 830, and 850 may be utilized to perform at least a portion of a method according to one or more aspects of the present disclosure.

The downhole tools 820, 830, and/or 850 may be housed in a special type of drill collar, as it is known in the art, and may include capabilities for measuring, processing, and/or storing information, as well as for communicating with the other downhole tools 820, 830, and/or 850, and/or directly with a logging and control system and/or other surface equipment 860. Such communication may utilize any conventional and/or future-developed two-way telemetry system, such as a mud-pulse telemetry system, a wired drill pipe telemetry system, an electromagnetic telemetry system, and/or an acoustic telemetry system, among others within the scope of the present disclosure. One or more of the downhole tools 820, 830, and/or 850 may also comprise an apparatus (not shown) for generating electrical power for use by the BHA 800. Example devices to generate electrical power include, but are not limited to, a battery system and a mud turbine generator powered by the flow of the drilling fluid.

Figure 14:
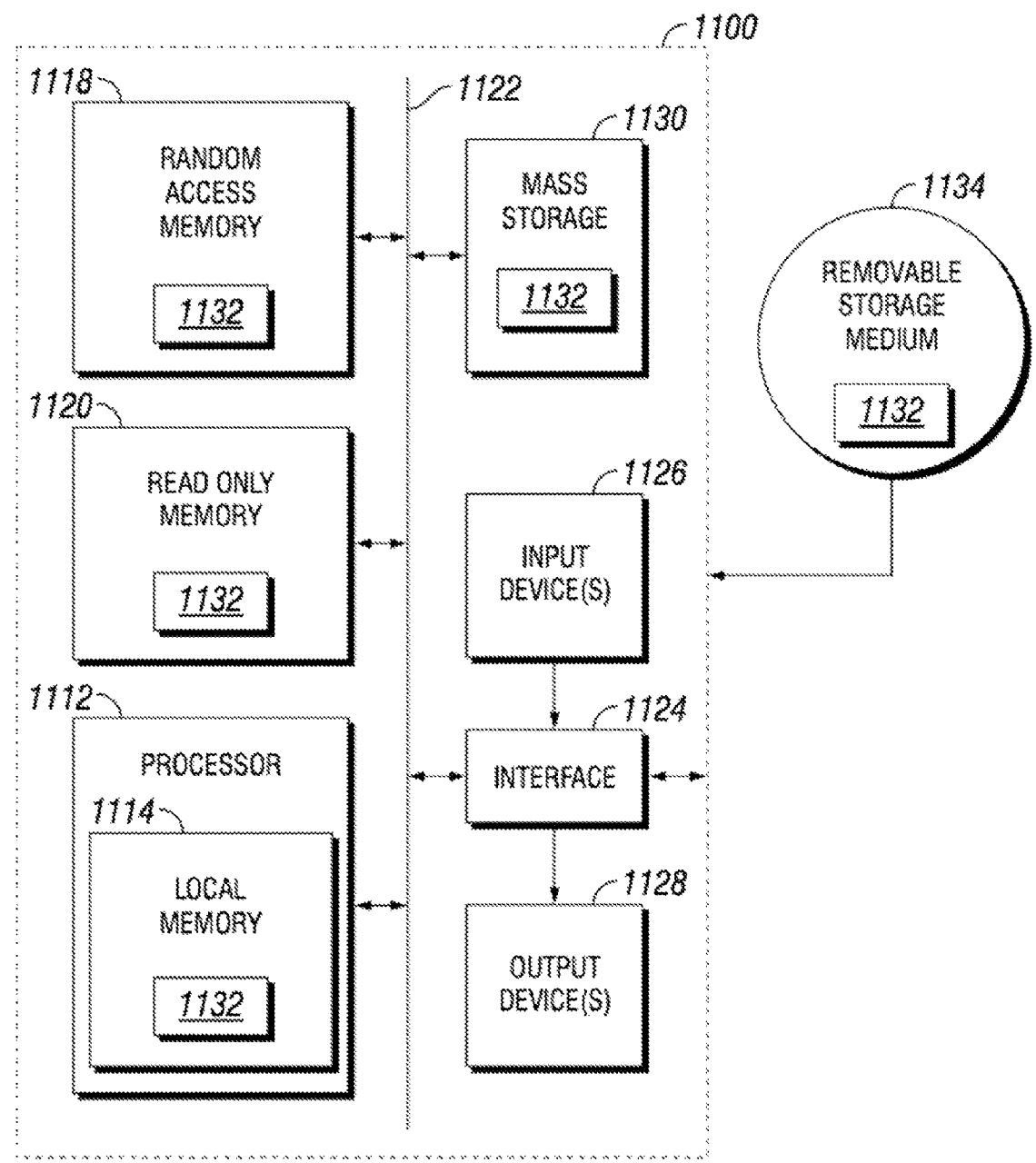
FIG. 14 is a schematic view of at least a portion of apparatus according to one or more aspects of the present disclosure.

FIG. 14 is a block diagram of an example processing system 1100 that may execute example machine-readable instructions used to implement one or more of the methods and/or processes described herein, and/or to implement the example downhole tools described herein. The processing system 1100 may be at least partially implemented in one or more of the downhole tools 705 and/or components 720 shown in FIG. 12, in one or more of the downhole tools 820, 830, and/or 850 shown in FIG. 13, in one or more surface equipment components (e.g., the logging and control system and/or other surface equipment 760 shown in FIG. 12, the logging and control system and/or other surface equipment 860 shown in FIG. 13, and/or one or more components thereof), and/or in some combination thereof. The processing system 1100 may be or comprise, for example, one or more processors, one or more controllers, one or more special-purpose computing devices, one or more servers, one or more personal computers, one or more personal digital assistant (PDA) devices, one or more smartphones, one or more internet appliances, and/or any other type(s) of computing device(s).

The system 1100 comprises a processor 1112 such as, for example, a general-purpose programmable processor. The processor 1112 includes a local memory 1114, and executes coded instructions 1132 present in the local memory 1114 and/or in another memory device. The processor 1112 may execute, among other things, machine-readable instructions to implement the methods and/or processes described herein. The processor 1112 may be, comprise or be implemented by any type of processing unit, such as one or more INTEL microprocessors, one or more microcontrollers from the ARM and/or PICO families of microcontrollers, one or more embedded soft/hard processors in one or more FPGAs, etc. Of course, other processors from other families are also appropriate.

The processor 1112 is in communication with a main memory including a volatile (e.g., random access) memory 1118 and a non-volatile (e.g., read-only) memory 1120 via a bus 1122. The volatile memory 1118 may be, comprise, or be implemented by static random access memory (SRAM), synchronous dynamic random access memory (SDRAM), dynamic random access memory (DRAM), RAMBUS dynamic random access memory (RDRAM) and/or any other type of random access memory device. The non-volatile memory 1120 may be, comprise, or be implemented by flash memory and/or any other desired type of memory device. One or more memory controllers (not shown) may control access to the main memory 1118 and/or 1120.

The processing system 1100 also includes an interface circuit 1124. The interface circuit 1124 may be, comprise, or be implemented by any type of interface standard, such as an Ethernet interface, a universal serial bus (USB) and/or a third generation input/output (3GIO) interface, among others.

One or more input devices 1126 are connected to the interface circuit 1124. The input device(s) 1126 permit a user to enter data and commands into the processor 1112. The input device(s) may be, comprise or be implemented by, for example, a keyboard, a mouse, a touchscreen, a track-pad, a trackball, an isopoint and/or a voice recognition system, among others.

One or more output devices 1128 are also connected to the interface circuit 1124. The output devices 1128 may be, comprise, or be implemented by, for example, display devices (e.g., a liquid crystal display or cathode ray tube display (CRT), among others), printers and/or speakers, among others. Thus, the interface circuit 1124 may also comprise a graphics driver card.

The interface circuit 1124 also includes a communication device such as a modem or network interface card to facilitate exchange of data with external computers via a network (e.g., Ethernet connection, digital subscriber line (DSL), telephone line, coaxial cable, cellular telephone system, satellite, etc.).

The processing system 1100 also includes one or more mass storage devices 1130 for storing machine-readable instructions and data. Examples of such mass storage devices 1130 include floppy disk drives, hard drive disks, compact disk drives and digital versatile disk (DVD) drives, among others.

The coded instructions 1132 may be stored in the mass storage device 1130, the volatile memory 1118, the non-volatile memory 1120, the local memory 1114 and/or on a removable storage medium, such as a CD or DVD 1134.

As an alternative to implementing the methods and/or apparatus described herein in a system such as the processing system of FIG. 14, the methods and or apparatus described herein may be embedded in a structure such as a processor and/or an ASIC (application specific integrated circuit).

In view of the entirety of the present disclosure, a person having ordinary skill in the art should readily recognize that the present disclosure introduces a method comprising: conveying a downhole imaging tool of a dip determination system within a borehole, wherein the borehole extends from a wellsite surface to a subterranean formation, and wherein the dip determination system further comprises surface equipment disposed at the wellsite surface; operating the downhole imaging tool to obtain an image of a geologic feature within the subterranean formation; and operating the dip determination system to determine an aspect of the geologic feature by: determining a symmetry axis of the image; determining a longitudinal component of the feature based on the determined symmetry axis; determining a transverse component of the feature based on the determined symmetry axis; splitting the longitudinal component into sections; combining the longitudinal component sections with the transverse component to determine one or more corresponding sinusoid segments; and assigning a single dip value to each depth based on the one or more sinusoid segments.

The image may be of a substantially horizontal portion of the borehole. Determining a symmetry axis of the image may comprise determining a probability of symmetry existence at each of a plurality of pixels associated with the geologic feature in the image. Determining a symmetry axis of the image may comprise generating a probability image in which, for each pixel in a given row and column of the image, an associated pixel value corresponds to the probability of the associated pixel being the symmetry axis. The row and column of the pixel may respectively correspond to depth and azimuth within the borehole.

The present disclosure also introduces a method comprising: conveying a downhole imaging tool of a dip determination system within a borehole, wherein the borehole extends from a wellsite surface to a subterranean formation, and wherein the dip determination system further comprises surface equipment disposed at the wellsite surface; operating the downhole imaging tool to obtain an image of a geologic feature within the subterranean formation; and operating the dip determination system to determine an aspect of the geologic feature by: for each of a plurality of pixels forming the image, determining a probability that a symmetry axis coincides with the pixel; generating a probability map depicting the determined probability of each pixel coinciding with the symmetry axis; superposing the probability map and the image to generate a mapped image; estimating the symmetry axis based on the mapped image; selecting a plurality of image pixels coinciding with a boundary of the geologic feature in each of a plurality of depth zones; fitting a segment of a sinusoid to the plurality of selected image pixels within each of the plurality of depth zones; and determining dip within each of the plurality of depth zones based on the fitted sinusoid segments therein.

Estimating the symmetry axis based on the mapped image may comprise selecting ones of the plurality of pixels that have a symmetry axis coincidence probability exceeding a predetermined threshold, and then interpolating the selected ones to estimate the symmetry axis.

The symmetry axis may define transverse dip components at any depth.

Determining dip within each of the plurality of depth zones may comprise averaging dip values within each of the plurality of depth zones that includes a plurality of overlapping sinusoid segments.

Determining dip within ones of the plurality of depth zones that lack sinusoid segments may comprise interpolating dip values from adjacent ones of the plurality of depth zones. The method may further comprise flagging the ones of the plurality of depth zones with interpolated dip values as being low quality.

Determining a probability that a symmetry axis coincides with a pixel may comprise evaluating similarity between the image of the geologic feature at the same depth and delimited by a first azimuth interval and a mirror image curve at the same depth and delimited by a second azimuth interval, wherein the first and second azimuth intervals extend equally in opposite azimuthal directions from the azimuthal location of the pixel.

Fitting a sinusoid segment to the plurality of selected image pixels within each of the plurality of depth zones may comprise fitting the sinusoid segment to the plurality of selected image pixels and a mirror image of the plurality of selected image pixels, wherein the mirror image is relative to the symmetry axis.

The present disclosure also introduces an apparatus comprising: a dip determination system comprising: a downhole imaging tool conveyable within a borehole that extends from a wellsite surface to a subterranean formation, wherein the downhole imaging tool is operable to obtain an image of a geologic feature within the subterranean formation while disposed in the borehole proximate the geologic feature; and surface equipment disposed at the wellsite surface and in electrical communication with the downhole image tool; wherein the dip determination system is operable to determine an aspect of the geologic feature by: for each of a plurality of pixels forming the image, determining a probability that a symmetry axis coincides with the pixel; generating a probability map depicting the determined probability of each pixel coinciding with the symmetry axis; superposing the probability map and the image to generate a mapped image; estimating the symmetry axis based on the mapped image; selecting a plurality of image pixels coinciding with a boundary of the geologic feature in each of a plurality of depth zones; fitting a segment of a sinusoid to the plurality of selected image pixels within each of the plurality of depth zones; and determining dip within each of the plurality of depth zones based on the fitted sinusoid segments therein.

Estimating the symmetry axis based on the mapped image may comprise selecting ones of the plurality of pixels that have a symmetry axis coincidence probability exceeding a predetermined threshold, and then interpolating the selected ones to estimate the symmetry axis.

Determining dip within each of the plurality of depth zones may comprise averaging dip values within each of the plurality of depth zones that includes a plurality of overlapping sinusoid segments.

Determining dip within ones of the plurality of depth zones that lack sinusoid segments may comprise interpolating dip values from adjacent ones of the plurality of depth zones.

Determining a probability that a symmetry axis coincides with a pixel may comprise evaluating similarity between the image of the geologic feature at the same depth and delimited by a first azimuth interval and a mirror image curve at the same depth and delimited by a second azimuth interval, wherein the first and second azimuth intervals extend equally in opposite azimuthal directions from the azimuthal location of the pixel.

Fitting a sinusoid segment to the plurality of selected image pixels within each of the plurality of depth zones may comprise fitting the sinusoid segment to the plurality of selected image pixels and a mirror image of the plurality of selected image pixels, wherein the mirror image is relative to the symmetry axis.

The downhole tool may be a wireline tool or a while-drilling tool.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same aspects introduced herein. Those skilled in the art should also realize that such equivalent constructions do not depart from the spirit and scope of the present disclosure, and that they may make various changes, substitutions and alterations herein without departing from the spirit and scope of the present disclosure. For example, although the preceding description has been described herein with reference to particular means, materials and embodiments, it is not intended to be limited to the particulars disclosed herein; rather, it extends to functionally equivalent structures, methods, and uses, such as are within the scope of the appended claims.

The Abstract at the end of this disclosure is provided to comply with 37 C.F.R. §1.72(b) to permit the reader to quickly ascertain the nature of the technical disclosure. It is submitted with the understanding that it will not be used to interpret or limit the scope or meaning of the claims.

What is claimed is:

1. A method, comprising:
   conveying a downhole imaging tool of a dip determination system within a borehole, wherein the borehole extends from a wellsite surface to a subterranean formation, and wherein the dip determination system further comprises surface equipment disposed at the wellsite surface;
   operating the downhole imaging tool to obtain an image of a geologic feature within the subterranean formation; and
   operating the dip determination system to determine an aspect of the geologic feature by:
      determining a symmetry axis of the image;
      determining a longitudinal component of the feature based on the determined symmetry axis;
      determining a transverse component of the feature based on the determined symmetry axis;
      splitting the longitudinal component into sections;
      combining the longitudinal component sections with the transverse component to determine one or more corresponding sinusoid segments; and
      assigning a single dip value to each depth based on the one or more sinusoid segments.

2. The method of claim 1 wherein the image is of a substantially horizontal portion of the borehole.

3. The method of claim 1 wherein determining a symmetry axis of the image comprises determining a probability of symmetry existence at each of a plurality of pixels associated with the geologic feature in the image.

4. The method of claim 3 wherein determining a symmetry axis of the image comprises generating a probability image in which, for each pixel in a given row and column of the image, an associated pixel value corresponds to the probability of the associated pixel being the symmetry axis.

5. The method of claim 4 wherein the row and column of the pixel respectively correspond to depth and azimuth within the borehole.

6. A method, comprising:
   conveying a downhole imaging tool of a dip determination system within a borehole, wherein the borehole extends from a wellsite surface to a subterranean formation, and wherein the dip determination system further comprises surface equipment disposed at the wellsite surface;
   operating the downhole imaging tool to obtain an image of a geologic feature within the subterranean formation; and
   operating the dip determination system to determine an aspect of the geologic feature by:
      for each of a plurality of pixels forming the image, determining a probability that a symmetry axis coincides with the pixel;
      generating a probability map depicting the determined probability of each pixel coinciding with the symmetry axis;
      superposing the probability map and the image to generate a mapped image;
      estimating the symmetry axis based on the mapped image;
      selecting a plurality of image pixels coinciding with a boundary of the geologic feature in each of a plurality of depth zones;
      fitting a segment of a sinusoid to the plurality of selected image pixels within each of the plurality of depth zones; and
      determining dip within each of the plurality of depth zones based on the fitted sinusoid segments therein.

7. The method of claim 6 wherein estimating the symmetry axis based on the mapped image comprises:
   selecting ones of the plurality of pixels that have a symmetry axis coincidence probability exceeding a predetermined threshold;
   interpolating the selected ones to estimate the symmetry axis.

8. The method of claim 6 wherein the symmetry axis defines transverse dip components at any depth.

9. The method of claim 6 wherein determining dip within each of the plurality of depth zones comprises averaging dip values within each of the plurality of depth zones that includes a plurality of overlapping sinusoid segments.

10. The method of claim 6 wherein determining dip within ones of the plurality of depth zones that lack sinusoid segments comprises interpolating dip values from adjacent ones of the plurality of depth zones.

11. The method of claim 10 further comprising flagging the ones of the plurality of depth zones with interpolated dip values as being low quality.

12. The method of claim 6 wherein determining a probability that a symmetry axis coincides with a pixel comprises evaluating similarity between the image of the geologic feature at the same depth and delimited by a first azimuth interval and a mirror image curve at the same depth and delimited by a second azimuth interval, wherein the first and second azimuth intervals extend equally in opposite azimuthal directions from the azimuthal location of the pixel.

13. The method of claim 6 wherein fitting a sinusoid segment to the plurality of selected image pixels within each of the plurality of depth zones comprises fitting the sinusoid segment to the plurality of selected image pixels and a mirror image of the plurality of selected image pixels, wherein the mirror image is relative to the symmetry axis.

14. An apparatus, comprising:
a dip determination system comprising:
   a downhole imaging tool conveyable within a borehole that extends from a wellsite surface to a subterranean formation, wherein the downhole imaging tool is operable to obtain an image of a geologic feature within the subterranean formation while disposed in the borehole proximate the geologic feature; and
   surface equipment disposed at the wellsite surface and in electrical communication with the downhole image tool;
wherein the dip determination system is operable to determine an aspect of the geologic feature by:
   for each of a plurality of pixels forming the image, determining a probability that a symmetry axis coincides with the pixel;
   generating a probability map depicting the determined probability of each pixel coinciding with the symmetry axis;
   superposing the probability map and the image to generate a mapped image;
   estimating the symmetry axis based on the mapped image;
   selecting a plurality of image pixels coinciding with a boundary of the geologic feature in each of a plurality of depth zones;
   fitting a segment of a sinusoid to the plurality of selected image pixels within each of the plurality of depth zones; and
   determining dip within each of the plurality of depth zones based on the fitted sinusoid segments therein.

15. The apparatus of claim 14 wherein estimating the symmetry axis based on the mapped image comprises:
   selecting ones of the plurality of pixels that have a symmetry axis coincidence probability exceeding a predetermined threshold;
   interpolating the selected ones to estimate the symmetry axis.

16. The apparatus of claim 14 wherein determining dip within each of the plurality of depth zones comprises averaging dip values within each of the plurality of depth zones that includes a plurality of overlapping sinusoid segments.

17. The apparatus of claim 14 wherein determining dip within ones of the plurality of depth zones that lack sinusoid segments comprises interpolating dip values from adjacent ones of the plurality of depth zones.

18. The apparatus of claim 14 wherein determining a probability that a symmetry axis coincides with a pixel comprises evaluating similarity between the image of the geologic feature at the same depth and delimited by a first azimuth interval and a mirror image curve at the same depth and delimited by a second azimuth interval, wherein the first and second azimuth intervals extend equally in opposite azimuthal directions from the azimuthal location of the pixel.

19. The apparatus of claim 14 wherein fitting a sinusoid segment to the plurality of selected image pixels within each of the plurality of depth zones comprises fitting the sinusoid segment to the plurality of selected image pixels and a mirror image of the plurality of selected image pixels, wherein the mirror image is relative to the symmetry axis.

20. The apparatus of claim 14 wherein the downhole tool is a wireline tool or a while-drilling tool.

* * * * *